(12) United States Patent
Villmark

(10) Patent No.: US 10,461,862 B2
(45) Date of Patent: Oct. 29, 2019

(54) SUBSEA FIBER OPTICAL TERMINATION MODULE

(71) Applicant: Siemens Aktiengesellschaft, Munich (DE)

(72) Inventor: Trond Holger Villmark, Kongsberg (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/661,017

(22) Filed: Jul. 27, 2017

(65) Prior Publication Data

US 2018/0083705 A1 Mar. 22, 2018

(30) Foreign Application Priority Data

Sep. 19, 2016 (EP) .................................. 16189484

(51) Int. Cl.
*H04B 10/25* (2013.01)
*G02B 6/38* (2006.01)
(Continued)

(52) U.S. Cl.
CPC ....... *H04B 10/2504* (2013.01); *G02B 6/3816* (2013.01); *G02B 6/3897* (2013.01);
(Continued)

(58) Field of Classification Search
CPC .. G02B 6/3816; G02B 6/3897; G02B 6/4427; G02B 6/4428; G02B 6/4471;
(Continued)

(56) References Cited

U.S. PATENT DOCUMENTS

| 4,408,828 | A | * | 10/1983 | Le Noane | ............ | G02B 6/4427 |
| | | | | | | 385/103 |
| 4,682,848 | A | * | 7/1987 | Cairns | .................. | G02B 6/3816 |
| | | | | | | 385/69 |

(Continued)

OTHER PUBLICATIONS

Extended European Search Report dated Feb. 27, 2017.

*Primary Examiner* — Abbas H Alagheband
(74) *Attorney, Agent, or Firm* — Harness, Dickey & Pierce, P.L.C.

(57) ABSTRACT

In an embodiment, a subsea fiber optical termination module for deployment in a subsea environment, includes at least one fiber optical termination unit for terminating a fiber optical cable, the fiber optical cable including a plurality of optical fibers. Further, the subsea fiber optical termination module includes one or more optical connectors and at least one connecting tube, each connecting tube containing one or more of the plurality of optical fibers and connecting one or more of the plurality of optical fibers from the high-pressure section to the at least one optical connector. The subsea fiber optical termination module includes a support structure including at least one recess and at least one support element, the at least one recess accommodating the at least one optical connector and the at least one support element being configured to connect the at least one fiber optical termination unit to the support structure.

23 Claims, 11 Drawing Sheets

(51) Int. Cl.
  *G02B 6/44* (2006.01)
  *H04B 10/80* (2013.01)
(52) U.S. Cl.
  CPC ......... *G02B 6/4427* (2013.01); *G02B 6/4428* (2013.01); *G02B 6/4471* (2013.01); *H04B 10/80* (2013.01)
(58) Field of Classification Search
  CPC .. G02B 6/4494; G02B 6/506; H04B 10/2504; H04B 10/80; H02G 15/14
  USPC ............................................. 398/214, 77–94
  See application file for complete search history.

(56) References Cited

U.S. PATENT DOCUMENTS

| | | | | |
|---|---|---|---|---|
| 4,696,540 A * | 9/1987 | Adams | ..................... | G02B 6/32 385/66 |
| 5,037,177 A * | 8/1991 | Brown | ................. | G02B 6/3801 385/100 |
| 5,301,959 A * | 4/1994 | Gould | ................. | G02B 6/4428 174/77 R |
| 5,738,535 A * | 4/1998 | Cairns | ................. | G02B 6/3816 439/138 |
| 6,017,227 A * | 1/2000 | Cairns | ................. | G02B 6/3816 439/138 |
| 6,161,618 A * | 12/2000 | Parks | ................. | E21B 33/0355 137/236.1 |
| 6,496,629 B2 * | 12/2002 | Ma | ....................... | G02B 6/4427 385/113 |
| 6,796,821 B2 * | 9/2004 | Cairns | ................. | G02B 6/4428 439/204 |
| 8,734,026 B2 * | 5/2014 | Nagengast | ......... | E21B 33/0385 385/77 |
| 8,792,759 B2 * | 7/2014 | Benton | ................ | G02B 6/3816 385/101 |
| 8,899,841 B2 * | 12/2014 | Cairns | ................. | G02B 6/4428 385/53 |
| 9,116,323 B2 * | 8/2015 | Cairns | ................. | G02B 6/4441 |
| 9,175,522 B2 * | 11/2015 | Lynch | ....................... | F16L 1/26 |
| 9,304,269 B2 * | 4/2016 | Jamtveit | ................... | F16L 1/12 |
| 9,696,509 B2 * | 7/2017 | Kimbrell | .............. | G02B 6/4428 |
| 9,715,068 B2 * | 7/2017 | Cairns | ............... | H01R 13/5205 |
| 2002/0044750 A1 * | 4/2002 | Ma | ....................... | G02B 6/4427 385/113 |
| 2003/0094281 A1 * | 5/2003 | Tubel | ..................... | E21B 47/00 166/250.03 |
| 2003/0228783 A1 * | 12/2003 | Cairns | ................. | G02B 6/4428 439/204 |
| 2009/0288836 A1 * | 11/2009 | Goodall | ..................... | F16L 1/26 166/336 |
| 2012/0263420 A1 * | 10/2012 | Benton | ................ | G02B 6/3816 385/77 |
| 2014/0093247 A1 * | 4/2014 | Jamtveit | ................... | F16L 1/12 398/104 |
| 2014/0233898 A1 * | 8/2014 | Kimbrell | .............. | G02B 6/4428 385/107 |
| 2014/0241810 A1 * | 8/2014 | Lynch | ..................... | F16L 1/26 405/170 |
| 2015/0129203 A1 * | 5/2015 | Deutch | ................... | E21B 43/11 166/250.1 |
| 2016/0127042 A1 * | 5/2016 | Farr | ..................... | H04B 10/2581 398/104 |
| 2016/0201402 A1 * | 7/2016 | McCleary | .............. | H02G 15/14 166/338 |
| 2016/0251940 A1 * | 9/2016 | De Witt | ................... | B23K 26/1224 166/304 |
| 2016/0365927 A1 * | 12/2016 | Bjoerklund | ............... | H04B 3/36 |
| 2017/0003455 A1 * | 1/2017 | Cairns | ................ | H01R 13/5205 |
| 2017/0005448 A1 * | 1/2017 | Williams | .............. | H01R 43/005 |

\* cited by examiner

SUBSEA FIBER OPTICAL TERMINATION MODULE

PRIORITY STATEMENT

The present application hereby claims priority under 35 U.S.C. § 119 to European patent application number EP 16189484.5 filed Sep. 19, 2016, the entire contents of which are hereby incorporated herein by reference.

FIELD

At least one embodiment of the present invention generally relates to a fiber optical termination module, in particular to a subsea fiber optical termination module for use in a subsea environment.

BACKGROUND

In subsea applications, for example subsea oil production, data communication demand is increasing for controlling and monitoring subsea equipment. The increasing data communication demand may be met by fiber-optical data communication.

For this purpose fiber optical cables of umbilicals are for example terminated by fiber optical terminations in umbilical termination heads located in a subsea environment.

Common fiber optical terminations include a tubular-shaped optical fiber termination unit receiving an optical cable from the umbilical and a plurality of hoses from the fiber optical termination unit to a plurality of optical connectors. The hoses fulfill the purpose of pressure compensating the oil filled side of the fiber optical termination. Due to this, a certain length of the hoses of 1-3 meters is required to compensate both the hoses and the dead volume in the fiber optical termination. However, limited space inside the umbilical termination heads for said hoses makes the installation of a fiber optical termination inside an umbilical termination head difficult and time consuming. This increases the risk of failure in the optical fibers due to bending. Further, hydrogen gas produced by zinc bars for cathodic corrosion protection can diffuse through the hoses and lead to physical degradation of the optical fiber, in particular to fiber darkening, and thereby the signal reading can be distorted and the system can possibly be rendered inoperable due to the optical loss budget being exceeded.

SUMMARY

Accordingly there is a need to provide a subsea fiber optical termination module, which is compact and can be pre-assembled and tested before installation into an umbilical termination head on site in an subsea environment.

Further advantageous features are subject matter of the claims.

According to an embodiment of the invention, a subsea fiber optical termination module for terminating at least one fiber optical cable is provided. The subsea fiber optical termination module is configured for deployment in a subsea environment where it is exposed to a high pressure prevailing in the subsea environment. Therein, the subsea fiber optical termination module comprises at least one fiber optical termination unit for terminating a fiber optical cable, wherein the fiber optical cable includes a plurality of optical fibers. The at least one fiber optical termination unit comprises a high-pressure section and a low-pressure section, wherein when deployed in the subsea environment the pressure in the high-pressure section is higher than in the low-pressure section. Further, the subsea fiber optical termination module comprises at least one optical connector and at least one connecting tube, wherein each connecting tube contains one or more of the plurality of optical fibers and thereby connects one or more of the plurality of optical fibers from the high-pressure section to the at least one optical connector. Furthermore, the subsea fiber optical termination module includes a support structure comprising at least one recess, wherein each recess accommodates one of the at least one optical connectors. Further, the support structure comprises at least one support element configured to attach the at least one fiber optical termination unit to the support structure.

According to a further embodiment of the invention, an umbilical termination head comprises a subsea fiber optical termination module as described above. Thereby, an umbilical termination head is provided, in which the number of fiber optical terminations can be increased without increasing the physical size of the umbilical termination head. The installation of the fiber optical termination module into the umbilical termination head on site in a subsea environment is quick and easy, as the fiber optical terminations can be pre-assembled in fiber optical termination modules and tested before installation. Therein, most of the assembly can be done in a workshop in the factory, before the module is transported to site for installation, where then only one unit needs to be terminated inside the umbilical termination head. This will reduce work time on site significantly and reduce the risk of failure during installation.

Although specific features described in the above summary and the following detailed description are described in connection with specific embodiments and aspects of the present invention, it should be understood that the features of the example embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF THE EXAMPLE EMBODIMENTS

Figure 1:
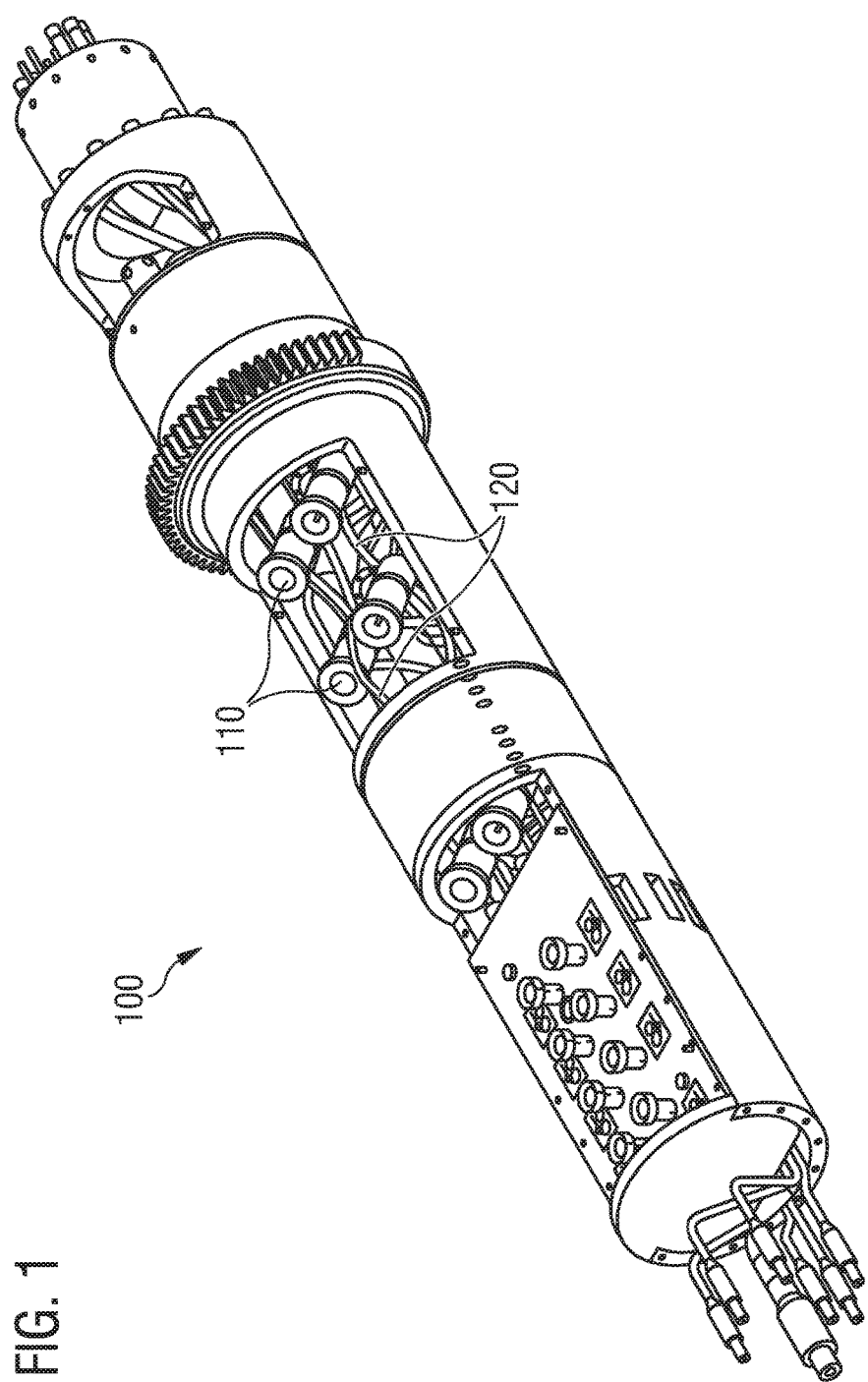
FIG. 1 illustrates a perspective view of a common umbilical termination head known in the art.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to an embodiment of the invention, a subsea fiber optical termination module for terminating at least one fiber optical cable is provided. The subsea fiber optical termination module is configured for deployment in a subsea environment where it is exposed to a high pressure prevailing in the subsea environment. Therein, the subsea fiber optical termination module comprises at least one fiber optical termination unit for terminating a fiber optical cable, wherein the fiber optical cable includes a plurality of optical fibers. The at least one fiber optical termination unit comprises a high-pressure section and a low-pressure section, wherein when deployed in the subsea environment the pressure in the high-pressure section is higher than in the low-pressure section. Further, the subsea fiber optical termination module comprises at least one optical connector and at least one connecting tube, wherein each connecting tube contains one or more of the plurality of optical fibers and thereby connects one or more of the plurality of optical fibers from the high-pressure section to the at least one optical connector. Furthermore, the subsea fiber optical termination module includes a support structure comprising at least one recess, wherein each recess accommodates one of the at least one optical connectors. Further, the support structure comprises at least one support element configured to attach the at least one fiber optical termination unit to the support structure.

Thereby, a subsea fiber optical termination module is provided, which is compact, and can be pre-assembled and tested before installation in an umbilical termination head on site in an subsea environment. Thereby, most of the assembly can be done in the workshop in the factory, before the module is transported to site for installation, where in this case only one unit needs to be terminated. Thus, the at least one optical connector and the optical fiber termination unit with at least one connecting tube can be tested in a workshop FAT (Factory Acceptance Test) beforehand. This will reduce work time on site significantly and reduce the risk of failure during installation.

The at least one connecting tube and the high-pressure section of the at least one fiber optical termination unit can further be oil-filled. The oil filling provides the effect of balancing the pressure inside the component to the outside sea water pressure prevailing in the subsea environment and further provides protection against chemical environmental influences on the one or more of the plurality of optical fibers.

Further, the subsea fiber optical termination module can comprise at least one pressure compensator, wherein the at least one pressure compensator balances an internal pressure of the at least one connecting tube and the high-pressure section of the at least one fiber optical termination unit to a sea water pressure prevailing in the ambient environment, in particular in the subsea environment when installed subsea. By balancing the internal pressure of the at least one connecting tube and the high-pressure section of the at least one fiber optical termination unit to a sea water pressure prevailing in the ambient environment, mechanical stress on the components by the sea water pressure prevailing in the ambient environment can be prevented. Further, by the use of a pressure compensator instead of using the common polymeric hoses with a length of 1-3 meters for pressure compensating, the at least one connecting tube can be designed much shorter and, thereby, the module can be designed in a much more compact and cost-saving form.

The at least one connecting tube can be made of a form-stable material, wherein an internal pressure inside the at least one connecting tube can be substantially different from an external pressure outside the at least one connecting tube. By using a form-stable material, the shape of the at least one connecting tube can be designed and pre-formed in factory with less risk that the optical fibers inside the at least one connecting tube are bent and damaged during installation, for example in a subsea environment.

The at least one connecting tube can be made of steel and the pressure compensator can be a steel pressure compensator. By the use of steel as a material, the diffusion of hydrogen gas produced by zinc bars for cathodic corrosion protection into the inside of the at least one connecting tube, which can lead to physical degradation of the optical fiber, in particular to fiber darkening, is reduced. Thereby, the risk that the signal reading is distorted and the system is possibly rendered inoperable due to the optical loss budget being exceeded is reduced significantly. Further, the lifetime of the optical fibers is increased.

The at least one connecting tube may also be made of a polymeric material. By the use of a polymeric material for the at least one connecting tube, the material cost of the at least one connecting tube is reduced and the need for designing the shape of the at least one connecting tube and fabricating corresponding production tooling for producing the at least one connecting tube can be avoided, thus reducing the overall cost for the module and providing more flexibility for design changes.

The at least one fiber optical termination unit can comprise a separating portion, which separates the low-pressure section from the high-pressure section, wherein the separating portion comprises at least two openings. Therein, each opening connects the low-pressure section to the high-pressure section. Further, the at least one fiber optical termination unit can comprise at least one fiber optical penetrator, wherein each fiber optical penetrator supplies at least one optical fiber from the low-pressure section through a corresponding opening in the separating portion to the high-pressure section. Therein, each fiber optical penetrator further provides at least one seal between the low-pressure section and the high-pressure section of the at least one fiber optical termination unit. Furthermore, each fiber optical penetrator can comprise at least two independent O-ring seals at different diameters on an outer circumferential surface of the fiber optical penetrator, wherein each O-ring seal provides a pressure seal arranged between the fiber optical penetrator and the separating portion. The at least two independent O-ring seals provide an improved sealing capacity between the high-pressure section and the low-pressure section in accordance with definitions from offshore standards.

The separating portion can further comprise at least one helium test port, which is in fluid communication with at least one fluidly interconnected helium test channel, wherein the at least one helium test channel is formed on the inside of the separating portion and is fluidly connected to one of at least one test spaces. Therein, the at least one test space is located between the at least two independent O-ring seals of each fiber optical penetrator. By the helium test port and the at least one fluidly interconnected helium test channel, a helium test on each of the O-ring seals can be performed in a fast and easy way in accordance with definitions from offshore standards.

The support structure can comprise a support plate, in which the at least one recesses are provided. The support plate provides a space-saving configuration, in which the at least one optical connector can be disposed and fixed in a compact and space-saving design in the subsea fiber optical termination module.

The at least one fiber optical termination unit and the at least one connecting tube can both be provided in a space facing one surface of the support plate. By arranging both the at least one fiber optical termination unit and the at least one connecting tube in the space facing one surface of the support plate, the subsea fiber optical termination module can be built in a more compact and space-saving design.

The at least one pressure compensator can be provided in a space facing the same surface of the support plate as the at least one connecting tube. The pressure compensator is thereby better protected against mechanical stress and can be better fluidly connected to the at least one oil-filled connecting tube.

The recesses and the optical connectors can be arranged on the support structure in at least two rows. This space-saving design with the optical connectors are arranged in at least two rows enables a compact design of the subsea fiber optical termination module.

In a subsea fiber optical termination module one fiber optical termination unit can be provided for each row of optical connectors. This space-saving design with one fiber optical termination unit for each row of optical connectors enables a compact design of the fiber optical termination module.

According to a further embodiment of the invention, an umbilical termination head comprises a subsea fiber optical termination module as described above. Thereby, an umbilical termination head is provided, in which the number of fiber optical terminations can be increased without increasing the physical size of the umbilical termination head. The installation of the fiber optical termination module into the umbilical termination head on site in a subsea environment is quick and easy, as the fiber optical terminations can be pre-assembled in fiber optical termination modules and tested before installation. Therein, most of the assembly can be done in a workshop in the factory, before the module is transported to site for installation, where then only one unit needs to be terminated inside the umbilical termination head. This will reduce work time on site significantly and reduce the risk of failure during installation.

In the following, concepts in accordance with example embodiments of the invention will be explained in more detail and with reference to the accompanying drawings.

In subsea applications, for example subsea oil production, data communication demand is increasing for controlling and monitoring subsea equipment. The increasing data communication demand may be met by fiber-optical data communication.

For this purpose fiber optical cables 214 of umbilicals are terminated by fiber optical terminations in umbilical termination heads located in subsea environments.

FIG. 1 illustrates a perspective view of a common umbilical termination head 100 known in the art. A plurality of optical connectors 110 are installed inside the common umbilical termination head 100. Each optical connector 110 is connected to a fiber optical termination unit 130 via a corresponding rubber connecting tube of a plurality of common rubber connecting tubes 120.

Figure 2:
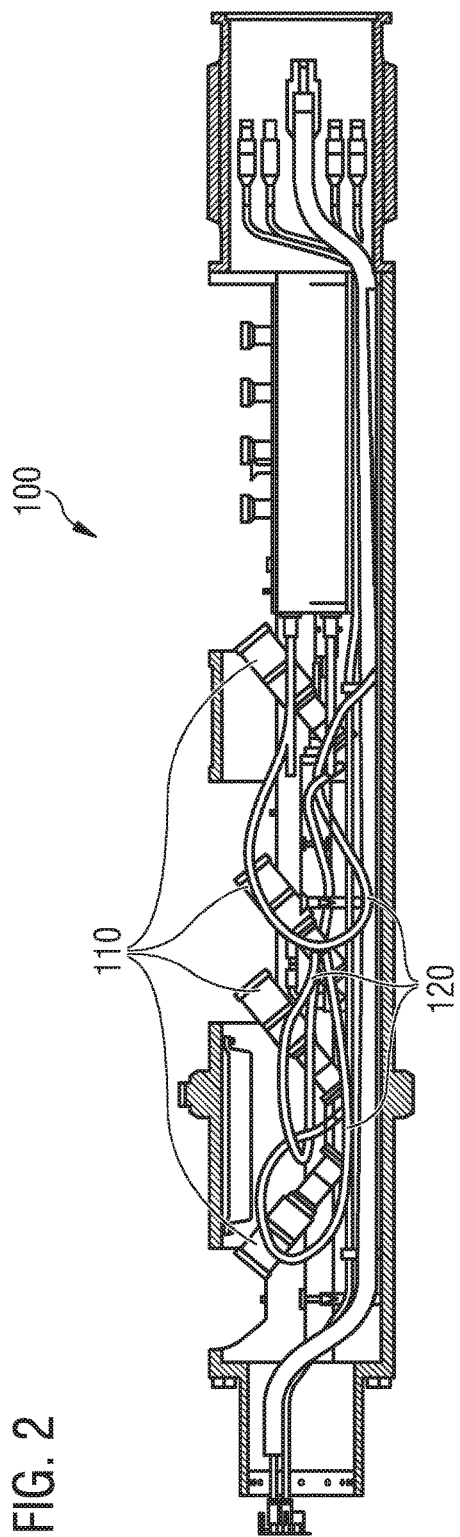
FIG. 2 illustrates a cross-sectional side view of the common umbilical termination head of FIG. 1.

FIG. 2 illustrates a cross-sectional side view of the common umbilical termination head of FIG. 1. A can be seen in FIG. 2, the plurality of common rubber connecting tubes 120 have to be bent into a space-consuming curved shape with a wide bending radius, in order to fit into the housing of the common umbilical termination head 100 without damage within the optical fiber due to a too narrow bending radius.

Figure 3:
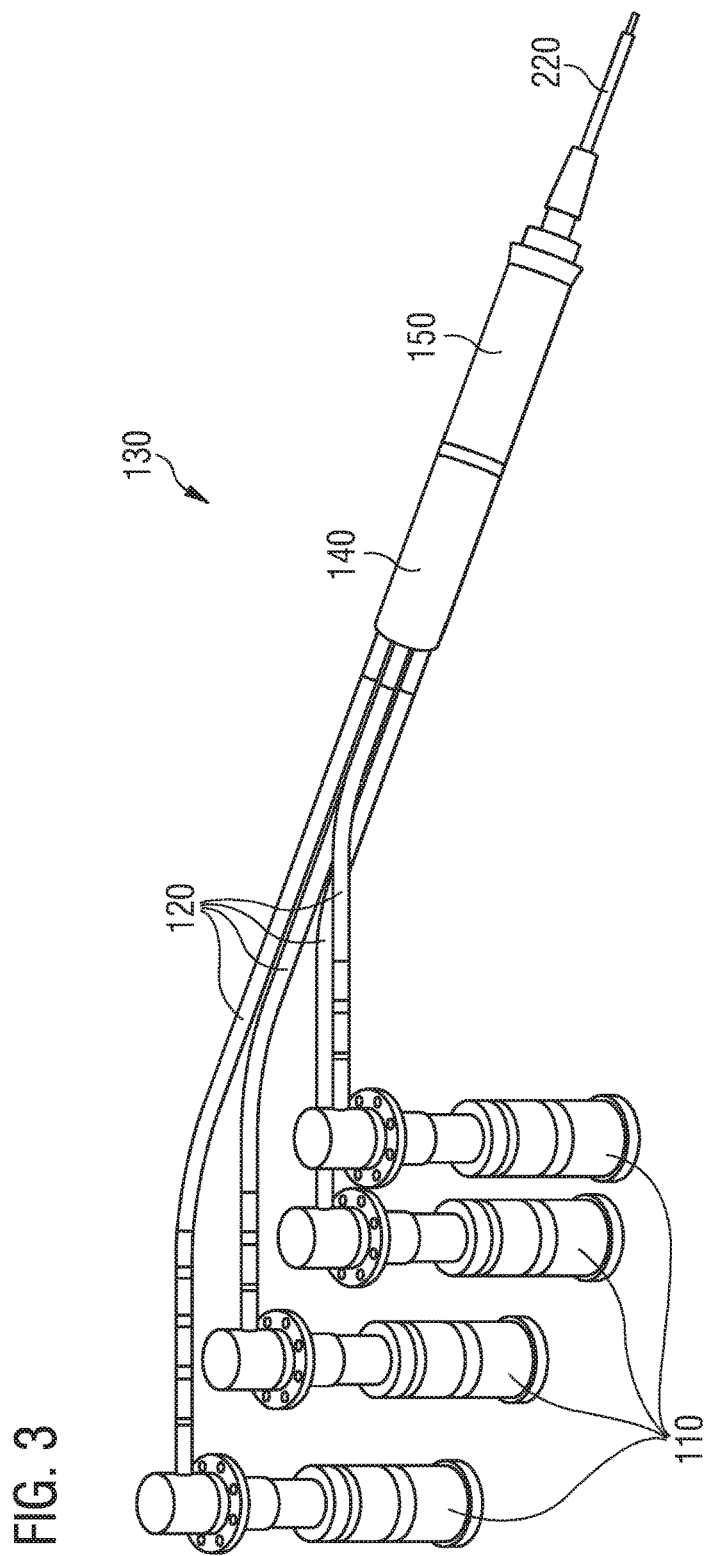
FIG. 3 illustrates a perspective view of a common fiber optical termination known in the art.

FIG. 3 illustrates a perspective view of a common fiber optical termination known in the art. A common fiber optical termination consists of a common fiber optical termination unit 130 receiving a plurality of optical fibers 410 from the fiber optical cable 220 of the umbilical. Further as shown in FIG. 3, a plurality of common rubber connecting tubes 120 provide the optical fibers 410 from the fiber optical termination unit 130 to optical connectors 110. The rubber connecting tubes 120 pressure compensate the oil filled side of the fiber optical termination unit 130. Due to this, traditionally a certain length of the rubber connecting tubes 120 of 1-3 meters is needed to compensate both the rubber connecting tubes 120 and the dead volume in the fiber optical termination unit 130.

Figure 4:
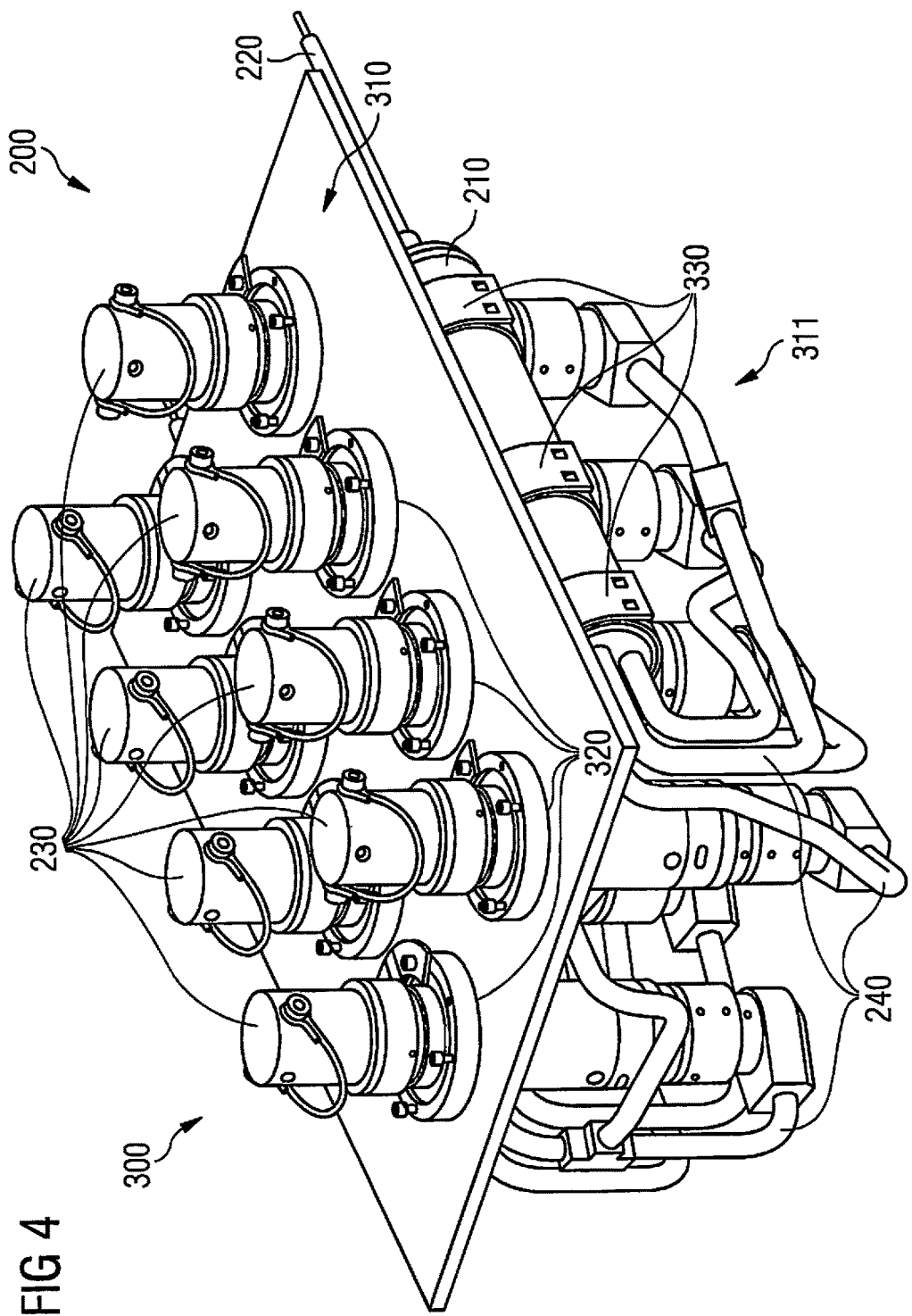
FIG. 4 illustrates a perspective side view of a fiber optical termination module according to embodiments of the present invention.

FIG. 4 illustrates a perspective side view of a fiber optical termination module 200, according to embodiments of the present invention. According to the embodiments shown in FIG. 4, a subsea fiber optical termination module 200 for terminating at least one fiber optical cable 220 is shown, which is configured for deployment in a subsea environment where it is exposed to a high pressure prevailing in the subsea environment.

Figure 9:
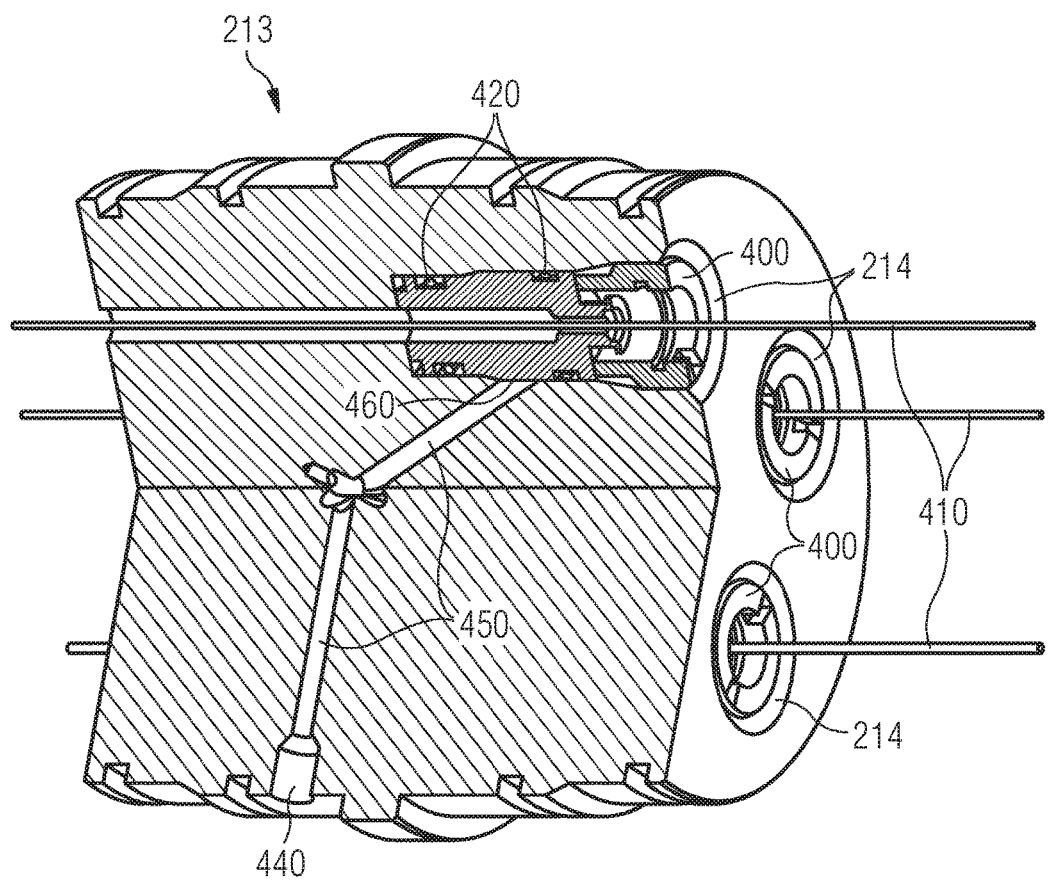
FIG. 9 illustrates a sectional view of a dividing portion with three fiber optical penetrators according to embodiments of the present invention.

The subsea fiber optical termination module 200 comprises two fiber optical termination units 210 for terminating a fiber optical cable 220, wherein a fiber optical cable 220 includes a plurality of optical fibers 410, as shown in FIG. 9. Further, the subsea fiber optical termination module 200 comprises eight optical connectors 230 and eight connecting tubes 240, wherein each connecting tube 240 contains one or more of the plurality of optical fibers 410 and connects the one or more of the plurality of optical fibers 410 from one of the fiber optical termination units 210 to one of the optical connectors 230.

As shown in FIG. 4, the subsea fiber optical termination module 200 includes a support structure 300 comprising a support plate 310 and eight recesses 320 within the support plate 310, wherein in each recess 320 one optical connector 230 is fixed or rotably supported by the support plate 310 in such a way, that each optical connector 230 extends through the support plate 310 from a space (311) facing one surface of the support plate 310 to a space facing the opposite side of the support plate 310. The support structure 300 comprises six support elements 330 configured to connect the fiber optical termination units 210 to the support structure 300, wherein each support element 330 is fixed to the support plate 310 and holds an optical termination unit. Each optical termination unit is held by three support elements 330. The fiber optical termination units 210 and the at least one connecting tube 240 are provided in the space (311) facing one surface of the support plate 310.

Figure 6:
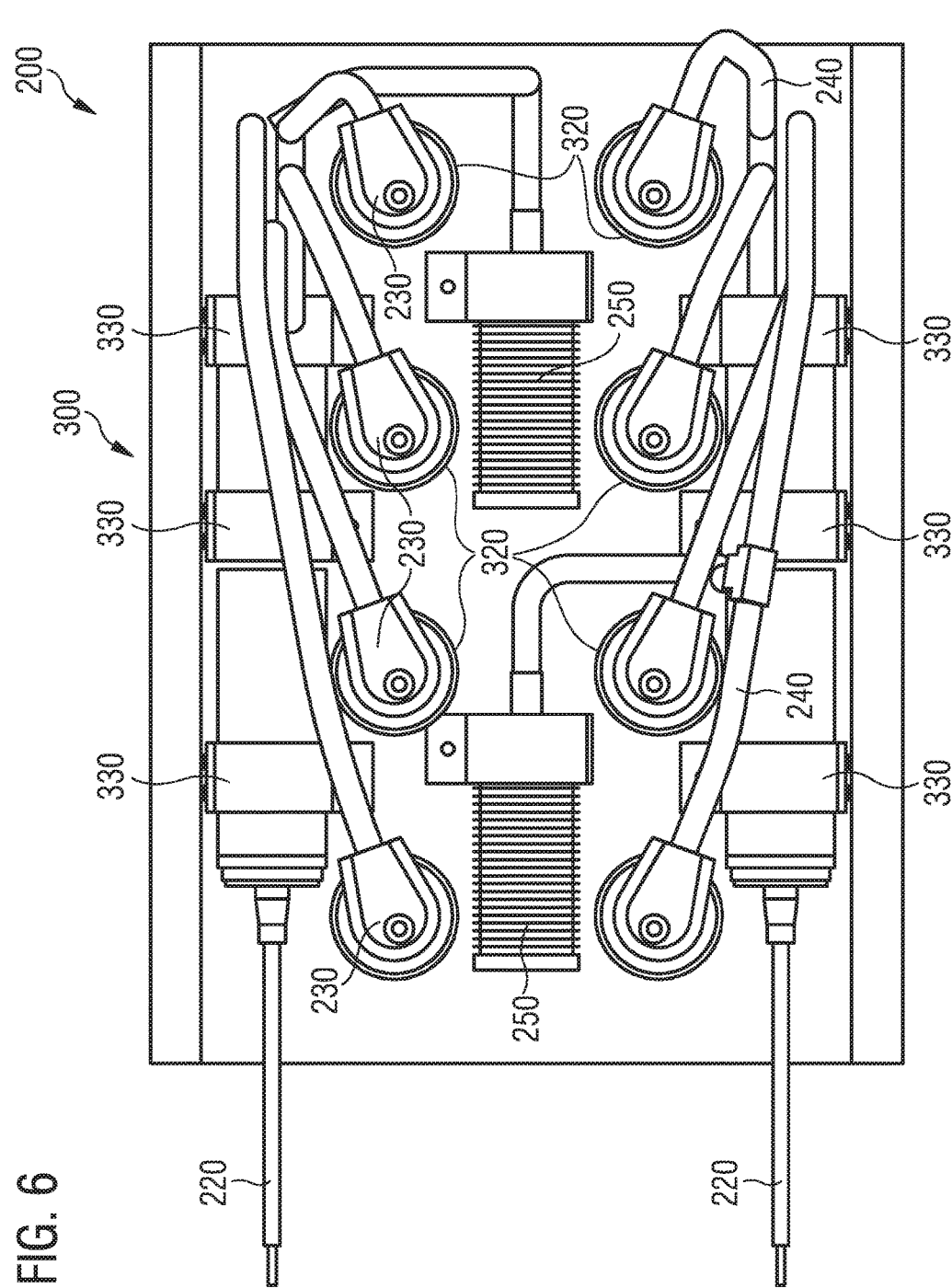
FIG. 6 illustrates a perspective bottom view of the fiber optical termination module of FIGS. 4 and 5.

Further, as shown in FIG. 6, the subsea fiber optical termination module 200 comprises two pressure compensators 250, wherein the pressure compensators 250 balance an internal pressure of the connecting tubes 240 and the high-pressure section 211 of each fiber optical termination unit 210 to a sea water pressure prevailing in the ambient environment, in particular in the subsea environment when installed subsea. The two pressure compensators 250 are provided in the space (311) facing the same surface of the support plate 310 as the connecting tubes 240. The pressure compensator 250 can be a steel pressure compensator.

The connecting tubes 240 can be made of a form-stable material, wherein an internal pressure inside the connecting tubes 240 can be substantially different from an external pressure outside the connecting tubes 240. The connecting tubes 240 can in particular be made of steel. The connecting tubes 240 can also be made of a polymeric material, in particular a flexible rubber material.

Figure 5:
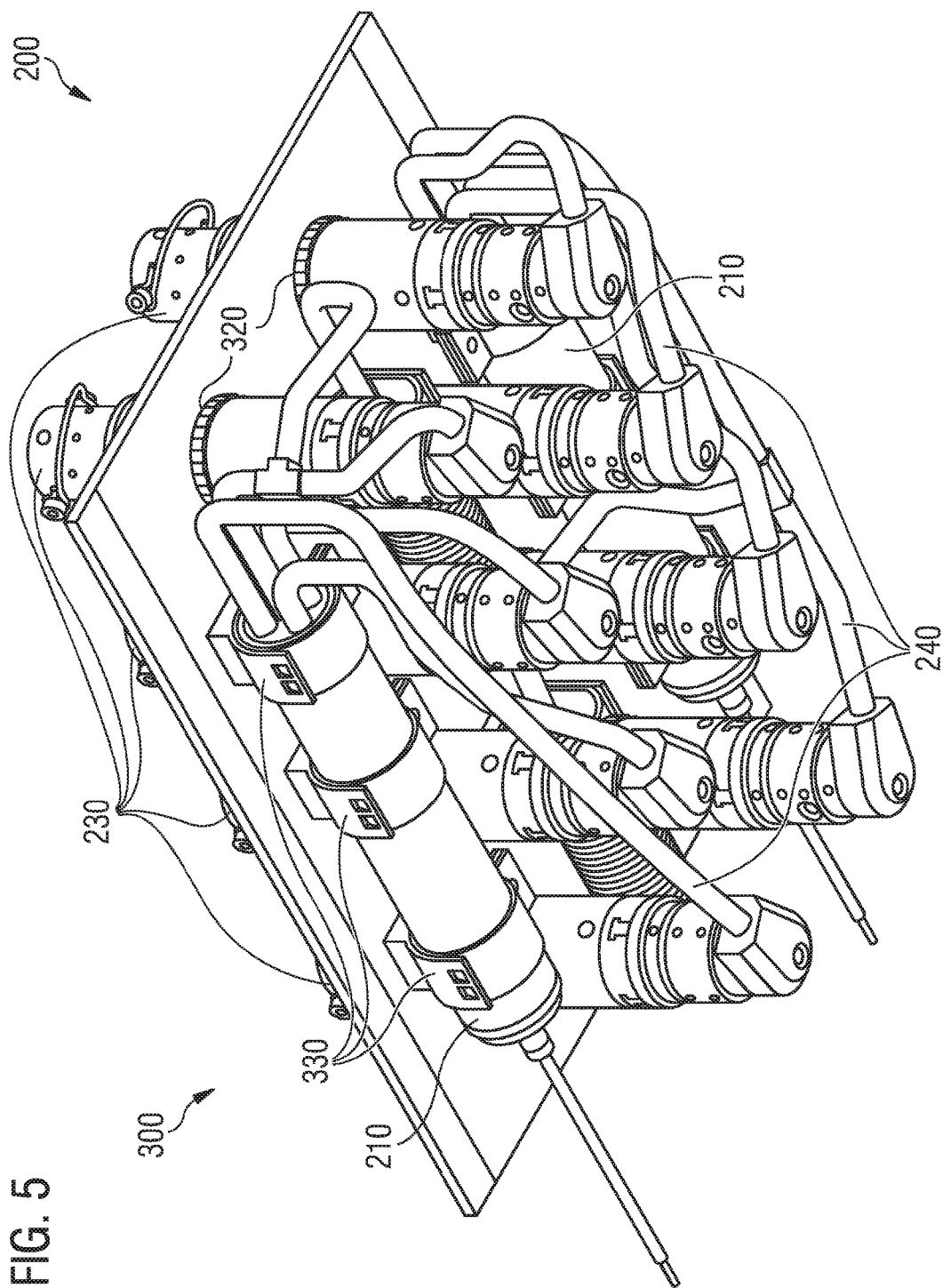
FIG. 5 illustrates a further perspective side view of the fiber optical termination module of FIG. 4.

Further as shown in FIGS. 4 to 6, the recesses 320 and the optical connectors 230 are arranged on the support structure 300 in at least two rows, wherein one fiber optical termination unit 210 is provided for each row of optical connectors 230.

FIG. 5 illustrates a further perspective side view of the fiber optical termination module 200 of FIG. 4.

FIG. 6 illustrates a perspective bottom view of the fiber optical termination module 200 of FIGS. 4 and 5.

As show in FIGS. 5 and 6, the two pressure compensators 250 are arranged between the two rows of optical connectors 230 and are fixed to the support plate 310. Each pressure compensator 250 is fluidly connected to one connecting tube 240 leading to one of the fiber optical termination units 210. The shape of the connecting tubes 240 is designed in a way, that each connecting tube 240 extends directly in direction of the corresponding optical connector, in order to minimize the overall length of the connecting tubes 240.

Figure 7:
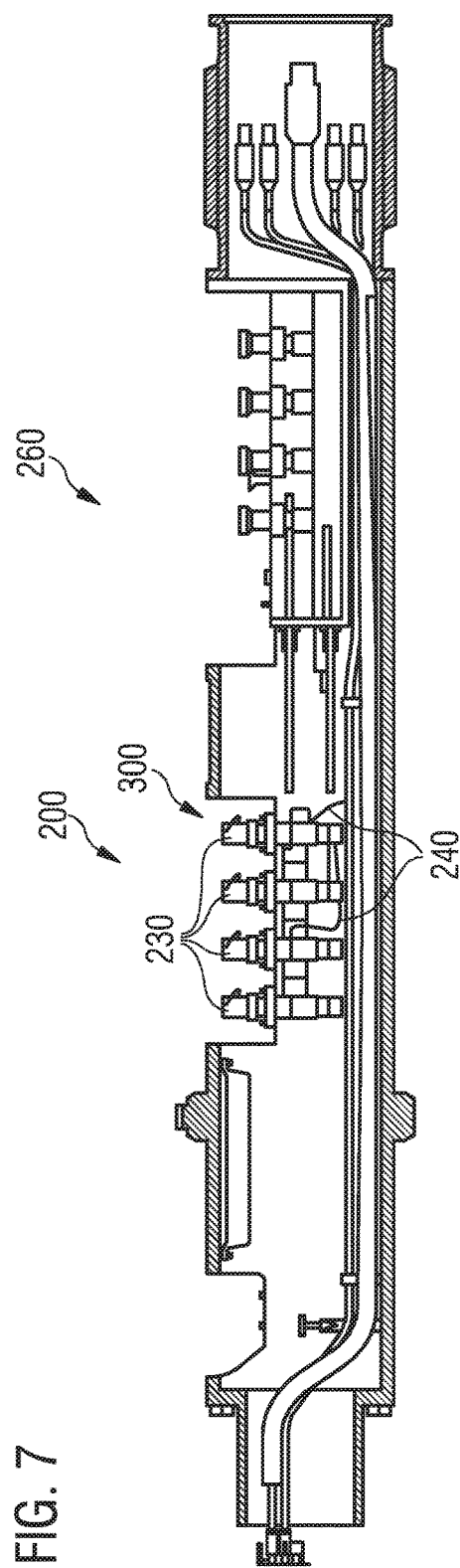
FIG. 7 illustrates a sectional side view of an umbilical termination head according to embodiments of the present invention.

FIG. 7 illustrates a sectional side view of an umbilical termination head, according to embodiments of the present invention. Inside the umbilical termination head, one module containing a support structure 300, at least one optical connector 230 and at least one connecting tube 240, as described above, is installed.

Figure 8:
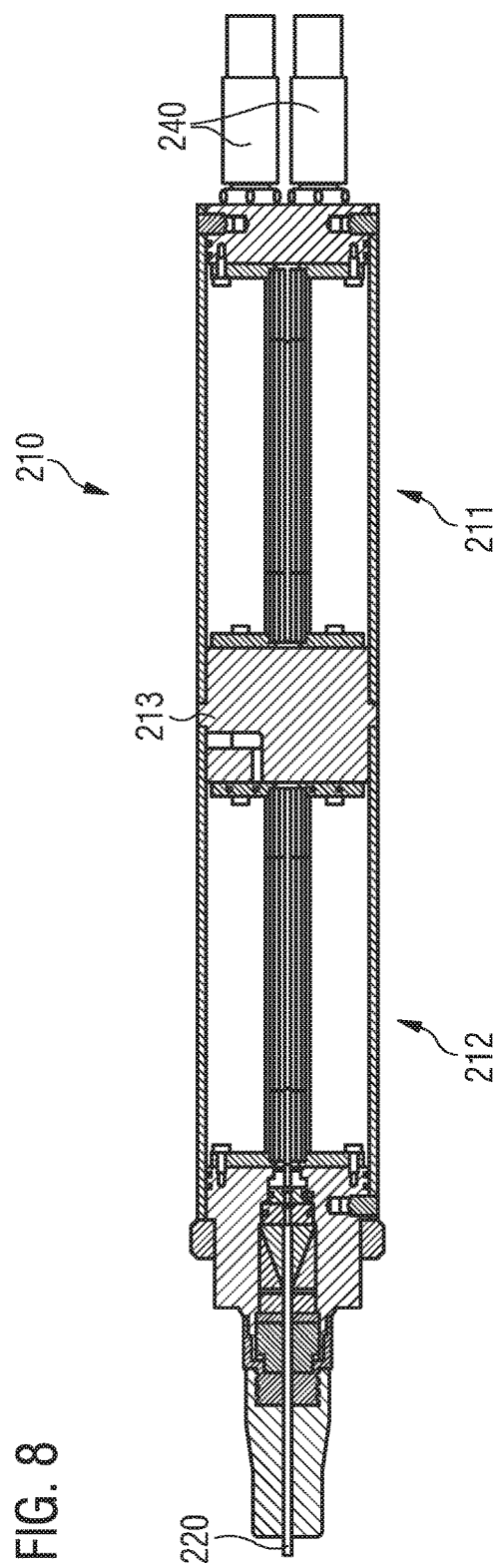
FIG. 8 illustrates a cross-sectional view of a fiber optical termination unit according to embodiments of the present invention.

FIG. 8 illustrates a cross-sectional view of a fiber optical termination unit, according to embodiments of the present invention. The fiber optical termination unit 210 comprises a high-pressure section 211 and a low-pressure section 212, wherein in the subsea environment the pressure in the high-pressure section 211 is higher than in the low-pressure section 212. A fiber optical cable 220 containing a plurality of optical fibers 410 is connected to the low-pressure section 212 and two connecting tubes 240 are connected to the high-pressure section 211. The high-pressure section 211 of the fiber optical termination unit 210 can further be oil-filled. Further, the fiber optical termination unit 210 comprises a separating portion 213, which separates the low-pressure section 212 from the high-pressure section 211.

FIG. 9 illustrates a sectional view of a dividing portion with three fiber optical penetrators 400, according to embodiments of the present invention. The separating portion 213 comprises at least three openings 214. Each opening 214 is configured to connect the low-pressure section 212 to the high-pressure section 211. Further, the fiber optical termination unit 210 comprises the three fiber optical penetrators 400, wherein each fiber optical penetrator 400 is disposed in a respective opening 214 of the dividing portion and further is configured to supply at least one optical fiber 410 from the low-pressure section 212 through a corresponding opening 214 in the separating portion 213 to the high-pressure section 211. Each fiber optical penetrator 400 further provides at least one seal between the low-pressure section 212 and the high-pressure section 211 of the fiber optical termination unit. Furthermore, each fiber optical penetrator 400 comprises two independent O-ring seals 420 at different diameters on an outer circumferential surface 430 of the fiber optical penetrator, wherein the each O-ring seal 420 provides a pressure seal arranged between the fiber optical penetrator 400 and a surface of the corresponding opening 214 in the separating portion 213.

The separating portion 213 further comprises a helium test port 440, which is in fluid communication with at least one fluidly interconnected helium test channel 450, wherein the helium test channel 450 is formed on the inside of the separating portion 213 and is each fluidly connected to a respective one of the at least one test spaces 460. Therein, each test space 460 is located on a surface of respective opening 214 between the two independent O-ring seals 420 of each of the fiber optical penetrators 400 when mounted in the opening 214.

Figure 10:
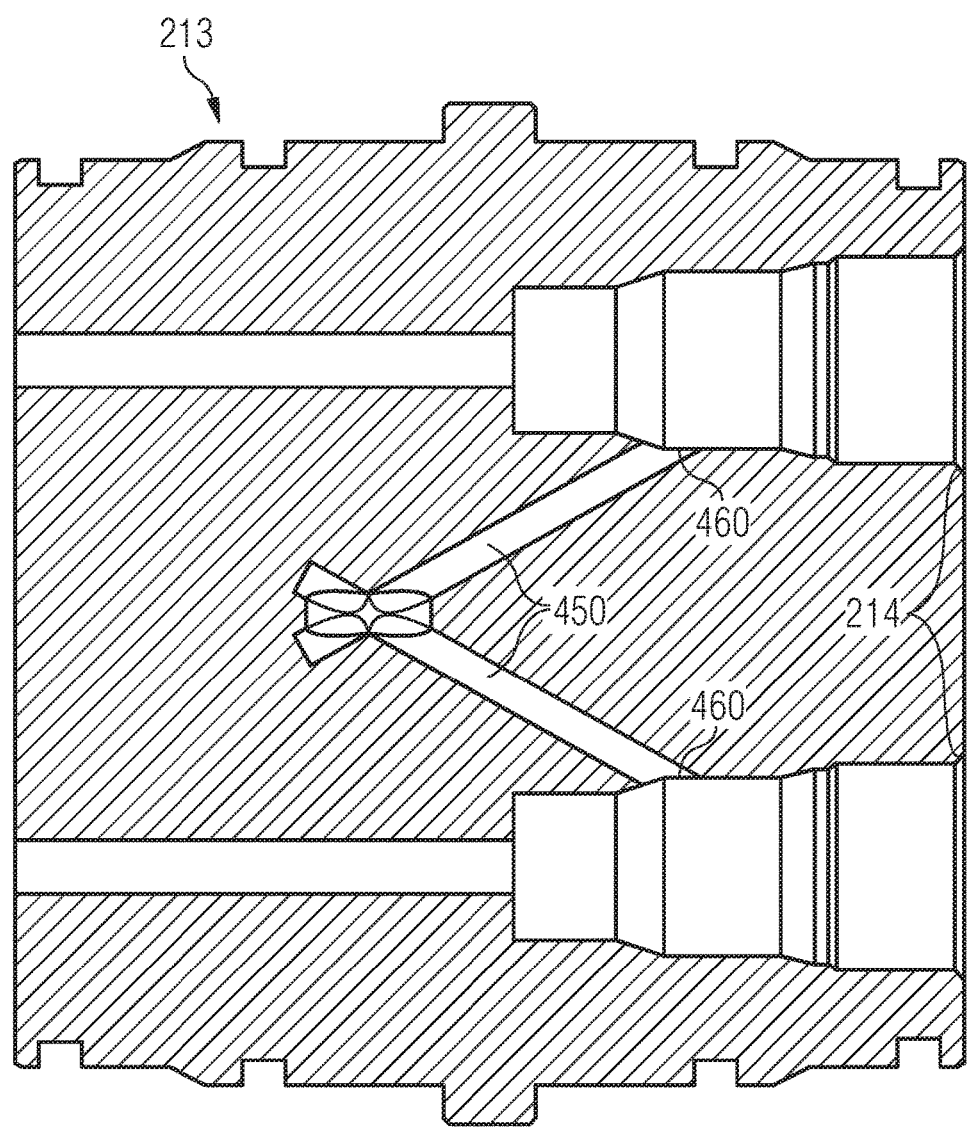
FIG. 10 illustrates a sectional view of the dividing portion of FIG. 9.

FIG. 10 illustrates a sectional view of the dividing portion of FIG. 9.

Figure 11:
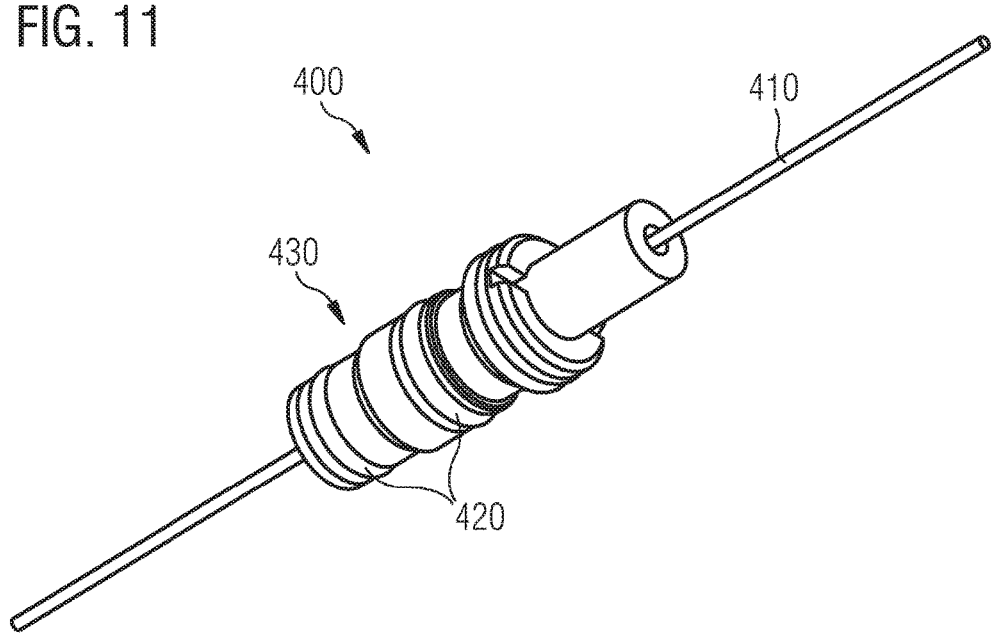
FIG. 11 illustrates a perspective view of a fiber optical penetrator, according to embodiments of the present invention.

FIG. 11 illustrates a perspective view of a fiber optical penetrator, according to embodiments of the present invention. At least one optical fiber 410 is fed through the fiber optical penetrator. On an outer circumferential surface 430 of the fiber optical penetrator 400 two O-ring seals 420 are disposed on different diameters of the outer circumferential surface 430.

Summarizing, a subsea fiber optical termination module is provided, which is compact, and can be pre-assembled and tested before installation in an umbilical termination head on site in an subsea environment. Thereby, most of the assembly and testing can be done in a workshop in factory, before the module is transported to site for installation, where in this case only one unit needs to be terminated. Thus, work time on site and the risk of failure during installation are significantly reduced, and further the lifetime of the optical fibers is increased.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A subsea fiber optical termination for terminating at least one fiber optical cable, the subsea fiber optical termination being configured for deployment in a subsea environment, the subsea fiber optical termination, comprising:
   at least one fiber optical termination to terminate a fiber optical cable, the fiber optical cable including a plurality of optical fibers, wherein the at least one fiber optical termination includes a high-pressure section and a low-pressure section therein, wherein when deployed in the subsea environment, a pressure in the high-pressure section is relatively higher than a pressure in the low-pressure section;
   at least one optical connector;
   at least one connecting tube, the at least one connecting tube containing one or more of the plurality of optical fibers, wherein the at least one connecting tube is configured to connect one or more of the plurality of optical fibers from the high-pressure section to the at least one optical connector; and
   a support structure including
      at least one recess to accommodate the at least one optical connector, and at least one support element configured to connect the at least one fiber optical termination to the support structure, wherein
   the at least one fiber optical termination includes
      a separating portion, to separate the low-pressure section from the high-pressure section,
      at least one opening, configured to connect the low-pressure section to the high-pressure section, and
      at least one fiber optical penetrator, each of the at least one fiber optical penetrator being configured to supply at least one optical fiber from the low-pressure section through a corresponding opening in the separating portion to the high-pressure section, and each of the at least one fiber optical penetrator being configured to provide at least one seal between the low-pressure section and the high-pressure section of the at least one fiber optical termination.

2. The subsea fiber optical termination of claim 1, wherein the at least one connecting tube and the high-pressure section of the at least one fiber optical termination are oil-filled.

3. The subsea fiber optical termination of claim 1, further comprising:
   at least one pressure compensator to balance an internal pressure of the at least one connecting tube and the high-pressure section of the at least one fiber optical termination to a sea water pressure prevailing in an ambient environment.

4. The subsea fiber optical termination of claim 1, wherein the at least one connecting tube is made of a form-stable material, and wherein an internal pressure inside the at least one connecting tube is different from an external pressure outside the at least one connecting tube.

5. The subsea fiber optical termination of claim 3, wherein the at least one connecting tube is made of steel and the at least one pressure compensator is a steel pressure compensator.

6. The subsea fiber optical termination of claim 1, wherein the at least one connecting tube is made of a polymeric material.

7. The subsea fiber optical termination of claim 1, wherein each of the at least one fiber optical penetrator comprises at least two independent O-ring seals at different diameters on an outer circumferential surface of the at least one fiber optical penetrator, each of the at least two independent O-ring seals being configured to provide a pressure seal arranged between the at least one fiber optical penetrator and the separating portion.

8. The subsea fiber optical termination of claim 1, wherein the separating portion further comprises at least one helium test port, in fluid communication with at least one fluidly interconnected helium test channel, the at least one helium test channel being formed on an inside of the separating portion and being fluidly connected to at least one test space, each at least one test space being located between the at least two independent O-ring seals of a respective one of the at least one fiber optical penetrator to perform a helium test on each O-ring seal.

9. The subsea fiber optical termination of claim 1, wherein the support structure comprises a support plate including the at least one recess.

10. The subsea fiber optical termination of claim 9, wherein the at least one fiber optical termination and the at least one connecting tube are each provided in a space facing one surface of the support plate.

11. The subsea fiber optical termination of claim 10, wherein at least one pressure compensator is provided in a space facing a same surface of the support plate as the at least one connecting tube.

12. The subsea fiber optical termination of claim 1, wherein the at least one recess and the at least one optical connector respectively include a plurality of recesses and a plurality of optical connectors, the plurality of recesses and the plurality of optical connectors being arranged on the support structure in at least two rows.

13. The subsea fiber optical termination of claim 12, wherein the at least one fiber optical termination is provided for each row of the plurality of optical connectors.

14. An umbilical termination head comprising the subsea fiber optical termination of claim 1.

15. The subsea fiber optical termination of claim 3, wherein the at least one pressure compensator is configured to balance the internal pressure of the at least one connecting tube and the high-pressure section of the at least one fiber optical termination to a sea water pressure prevailing in the subsea environment, when installed subsea.

16. The subsea fiber optical termination of claim 7, wherein the separating portion further comprises at least one helium test port, in fluid communication with at least one fluidly interconnected helium test channel, the at least one helium test channel being formed on an inside of the separating portion and being fluidly connected to at least one test space, each at least one test space being located between the at least two independent O-ring seals of a respective one of the at least one fiber optical penetrator to perform a helium test on each O-ring seal.

17. An umbilical termination head comprising the subsea fiber optical termination of claim 2.

18. The subsea fiber optical termination of claim 1, wherein the at least one connecting tube is received at a first end of the at least one fiber optical termination and the fiber optical cable is received at a second end of the at least one fiber optical termination.

19. A subsea fiber optical termination for terminating at least one fiber optical cable, the subsea fiber optical termination being configured for deployment in a subsea environment, the subsea fiber optical termination, comprising:
- at least one fiber optical termination to terminate a fiber optical cable, the fiber optical cable including a plurality of optical fibers, wherein the at least one fiber optical termination includes a high-pressure section and a low-pressure section therein, wherein when deployed in the subsea environment, a pressure in the high-pressure section is relatively higher than a pressure in the low-pressure section;
- at least one optical connector;
- at least one connecting tube, the at least one connecting tube containing one or more of the plurality of optical fibers, wherein the at least one connecting tube is configured to connect one or more of the plurality of optical fibers from the high-pressure section to the at least one optical connector;
- a support structure including at least one recess to accommodate the at least one optical connector, and at least one support element configured to connect the at least one fiber optical termination to the support structure; and
- at least one pressure compensator to balance an internal pressure of the at least one connecting tube and the high-pressure section of the at least one fiber optical termination to a sea water pressure prevailing in an ambient environment, wherein the at least one pressure compensator is configured to balance the internal pressure of the at least one connecting tube and the high-pressure section of the at least one fiber optical termination to a sea water pressure prevailing in the subsea environment, when installed subsea.

20. A subsea fiber optical termination for terminating at least one fiber optical cable, the subsea fiber optical termination being configured for deployment in a subsea environment, the subsea fiber optical termination, comprising:
- at least one fiber optical termination to terminate a fiber optical cable, the fiber optical cable including a plurality of optical fibers, wherein the at least one fiber optical termination includes a high-pressure section and a low-pressure section therein, wherein when deployed in the subsea environment, a pressure in the high-pressure section is relatively higher than a pressure in the low-pressure section;
- at least one optical connector;
- at least one connecting tube, the at least one connecting tube containing one or more of the plurality of optical fibers, wherein the at least one connecting tube is configured to connect one or more of the plurality of optical fibers from the high-pressure section to the at least one optical connector; and
- a support structure including at least one recess to accommodate the at least one optical connector, and at least one support element configured to connect the at least one fiber optical termination to the support structure, wherein the at least one recess and the at least one optical connector respectively include a plurality of recesses and a plurality of optical connectors, the plurality of recesses and the plurality of optical connectors being arranged on the support structure in at least two rows.

21. The subsea fiber optical termination of claim 20, wherein the at least one fiber optical termination is provided for each row of the plurality of optical connectors.

22. An umbilical termination head comprising the subsea fiber optical termination of claim 19.

23. An umbilical termination head comprising the subsea fiber optical termination of claim 20.

* * * * *